June 16, 1936. J. C. KARCHER 2,044,079
APPARATUS FOR DETERMINING SUBSURFACE TECTONICS OF THE EARTH
Filed April 16, 1934
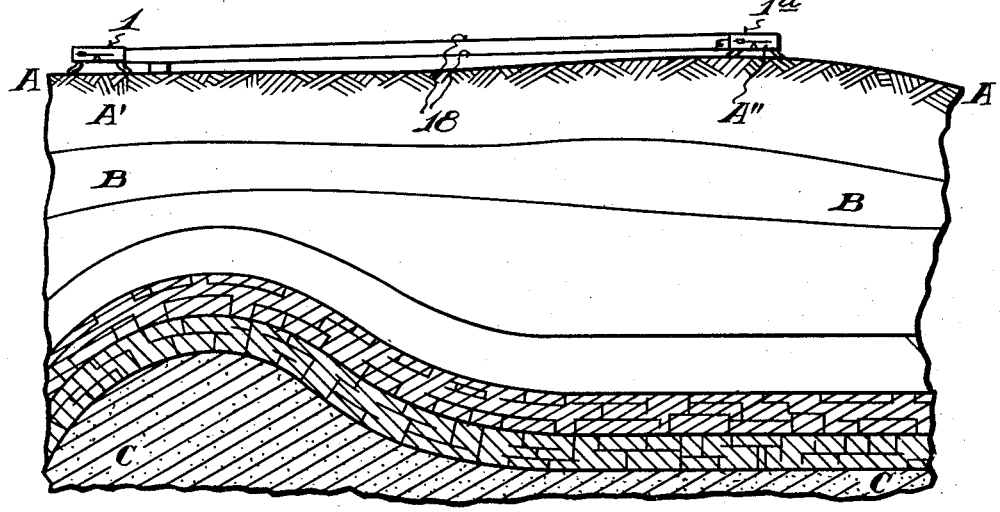
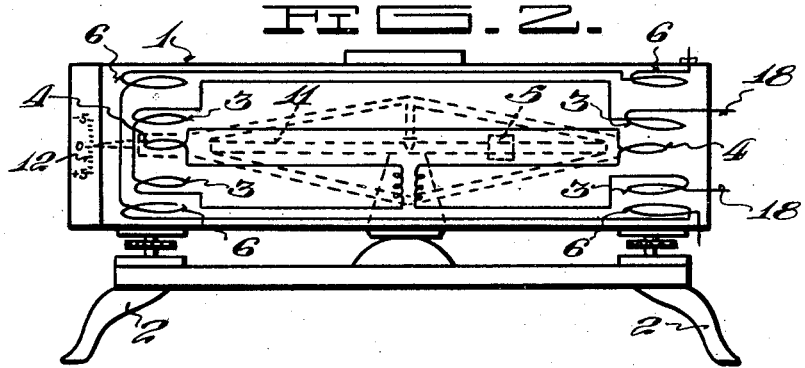
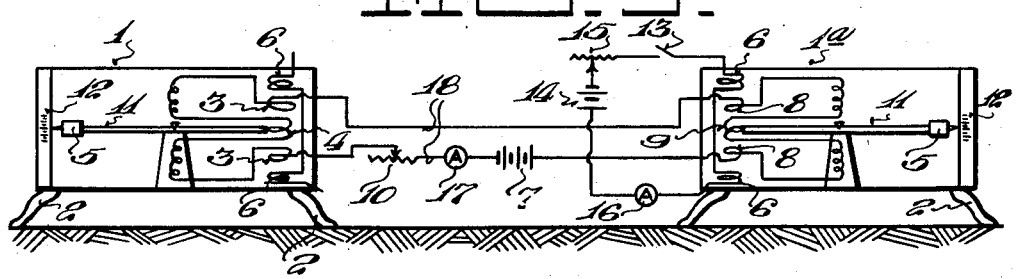
John C. Karcher
INVENTOR
BY
ATTORNEY Patented June 16, 1936

2,044,079

UNITED STATES PATENT OFFICE 2,044,079

APPARATUS FOR DETERMINING SUBSURFACE TECTONICS OF THE EARTH

John C. Karcher, Dallas, Tex.

Application April 16, 1934, Serial No. 720,916

5 Claims. (Cl. 265—1.4)

This invention relates to apparatus for determining the subsurface tectonics of the earth and it has particular reference to apparatus for determining the difference in the force of gravity between two points on or near the surface of the earth.

The principal object of the invention is to provide, through the medium of a plurality of electrical current balances, means for determining the difference in the gravitational constant between a plurality of points on or near the surface of the earth and through the medium of which, valuable deposits of minerals, oil and gas may be discovered.

With the foregoing object as paramount, the invention has particular reference to the novel apparatus, the latter being illustrated in the accompanying drawing, wherein:—

Figure 1 represents the surface of the earth, directly beneath which exists a substantially homogeneous formation which conceals a hill of rock of different density and further shows the position of the measuring apparatus embodying the invention.

Figure 2 is a preferred type of instrument used for determining the amount of electrical current flowing in a circuit and forming a part of the apparatus employed, and Figure 3 shows the relationship of the modified form of current balances as they are primarily set up.

Continuing with a more detailed description of the drawing, reference is primarily made to Figure 1 in which the characters A—A designate the surface of the earth, below which is shown a substantially homogeneous formation B—B. Below this formation is shown a buried hill of rock C—C of different density which is concealed by the formation B—B.

The invention makes use of what is commonly known as a Kelvin balance of a type substantially as described in the "Dictionary of Applied Physics", by Glazebrook, vol. 11, page 3, except for some slight modification which will be explained presently. The Kelvin balance is a device commonly used for making absolute determinations of the amount of electrical current flowing in a circuit. This is accomplished by causing the current to pass through one or more fixed coils and through one or two movable coils. In Figure 2 a current balance of the preferred form is shown in which I designates the housing therefor, supported upon legs 2. The fixed coils are designated at 3 while the movable coils are designated by the character 4 and are connected in series with the coils 3. The force between the coils 4 and the coils 3, as a result of the passage of current through the coils is balanced by adjusting the weight 5 until a balance is obtained. For the sake of clarity, the balance arm 11 and its associated elements are shown in Figure 2 in dotted lines.

If it were possible to measure the current with a sufficient degree of accuracy by means of a suitable current meter, one could move the balance to some other locality and adjust the electrical current to the same value as was required to obtain a balance at the first locality. Should the value of the gravitational force be different at the second locality from that which prevails at the first locality, there will be a lack of balance when the instrument is at the second position and the amount of unbalance would be a measure of the difference in the gravitational force between the two points of observation.

Since the changes of gravitational force between positions distant from each other by amounts of the order of a mile will not exceed in general an amount of the order of 2/1,000,000 of the total gravitational force, it is not possible at the present time to determine such gravitational force by the above procedure because it is not feasible at the present time to determine the value of electrical current to the necessary degree of accuracy.

In the present invention, this obstacle is overcome by the use of two Kelvin balances, I and Ia, which are electrically connected in series so that the same current passes through the coils in both balances and consequently an identical magnetic pull results in each of the coils. Manifestly, the balances should be constructed as nearly identical as possible, materials of like characteristics being used in each and the same number of turns of wire wound on the corresponding coils. Also, to the conventional Kelvin balance has been added coils 6.

The difference in gravity between two points may then be determined by proceeding in the following manner: First, the balances I and Ia are both set up at the first of two positions between which it is desired to determined the difference in gravitational force and sufficiently far apart so that they will not disturb each other. They are then connected as shown in Figure 3.

Current from the battery 7 will pass through the coils 3 and 4 of the balance I, connected in series and likewise through the coils 8 and 9 of the balance Ia, likewise connected in series with each other and also with coils 3 and 4 of the balance 1 and, since thus connected, the same current will pass through all of the coils. The current in the circuit is then varied by means of the rheostat 10 until the balance arm 11 of the balance 1 is placed in equilibrium as indicated on the scale 12 and is maintained in this position. If the balance 1a is then not in equilibrium, the switch 13 is closed. This causes a current to flow from the battery 14, through the auxiliary coils 6, rheostat 15 and ammeter 16. The rheostat 15 is adjusted until the balance 1a is also in equilibrium when the current I, as indicated by the ammeter 17 is read, as is also the current $i$, as indicated by the ammeter 16. Due account is taken as to direction of current in each circuit.

The balance 1 is then left at the first position as A' in Figure 1. Balance 1a is moved to a second distant point as the position A" in Figure 1. The balances are again connected up by means of the electrical wires 18.

The balance 1 is balanced as before by adjustment of the rheostat 10, after which balance 1a is balanced by adjustment of the rheostat 15; then the current $I_2$ is read on ammeter 17 and current $i_2$ is read on the ammeter 16, taking due account of the direction of flow of current in each circuit.

Since the balance 1 was not moved, the currents I and $I_2$ will be equal. The difference in gravitational force at the points A' and A" will then be given by the relation:

$$g = I(i_2 - i_1)K$$

where $g$ equals the difference in the gravitational force and $K$ is a constant of the balance 1a.

Various arrangements of electrical circuits may be used to observe the differential variation in gravitational constants but the results will be the same so long as two balances are used, such that the second balance will be approximately in equilibrium when the first balance is precisely in equilibrium as a result of a current common to the electrical circuits of the two balances. For instance, a potentiometer may be used to replace the battery and rheostat 15 in the auxiliary circuit of the balance 1a.

The effect of the earth's magnetic field may be reduced by placing the balances with the axes of the current coils parallel to the vertical component of the earth's magnetic field and the axes of rotation of the balance arms parallel to the horizontal component of the earth's magnetic field. Also, all observations may be repeated with directions of currents reversed and average values used. The influence of the earth's magnetic field may be further reduced by making the coils on opposite ends of the balance arms of the same polarity.

Either direct current or alternating current may be used. If alternating current is used an alternating current generator will replace the batteries 7 and 14 and either a single generator or two generators in synchronism may be used. Also, more than two balances may be used in the circuit.

It is further pointed out that any type of balance may be used wherein the force generated by the passage of an electric current is balanced by a gravitational force.

Manifestly, the several steps of the method and the elements by which these steps are carried out are capable of considerable modification and alteration and while the invention has been described with great particularity, certain changes may be made as may be found practicable without departing from the spirit and intent of the invention as set forth in the following claims therefor.

What is claimed is:

1. Apparatus for determining the difference in the gravitational constant between a plurality of spaced points comprising a plurality of similarly constructed Kelvin balances disposed at said points and electrically connected in series whereby to obtain a uniform magnetic flux in the coils of said balances, and means for indicating any difference of equilibrium between the several balances at said several points.

2. Apparatus for determining the difference in the gravitational force between two points on or near the earth's surface, comprising a pair of Kelvin balances electrically connected in series and constructed similarly whereby to obtain a uniform magnetic flux in the coils of said balances, and means for indicating the change in equilibrium of one balance when moved from one position to the other while the other balance is kept in equilibrium in a fixed position.

3. Apparatus for determining the gravitational force between a plurality of points on or near the earth's surface comprising a plurality of similarly constructed Kelvin balances electrically connected in series whereby to obtain a uniform magnetic pull in the coils of said balances, means for obtaining equilibrium of said balances, and means for indicating the change in equilibrium of the balances when certain of said balances are moved to points distant from the companion balances.

4. Apparatus for determining the difference in gravitational force between points by similarly constructed Kelvin balances wherein the magnetic force is balanced by gravity, said balances being electrically connected in series whereby to obtain a similar magnetic force in all of said balances, means for measuring the difference in gravitational force between said points by impressing an electromotive force on one of said balances after one of said balances has been moved to a point remote from another of said balances, and means for indicating the current necessary to bring said latter balance to equilibrium.

5. Apparatus for determining the difference in the gravitational force between two points comprising two similarly constructed and electrically connected Kelvin balances wherein magnetic force is balanced by gravity, said balances being connected in series whereby to obtain a uniform magnetic force in all of said balances, means for bringing said balances into equilibrium, means for measuring the difference in gravitational force between said points after one of said balances has been moved to a point remote from another of said balances, said means comprising an auxiliary circuit through one of said balances.

JOHN C. KARCHER.